(12) United States Patent
Klendworth et al.

(10) Patent No.: US 7,071,137 B2
(45) Date of Patent: Jul. 4, 2006

(54) METHOD OF MAKING A ZIEGLER-NATTA CATALYST

(75) Inventors: Douglas D. Klendworth, Westchester, OH (US); Frank Wolf Spaether, Wachenheim (DE)

(73) Assignee: Novolen Technology Holdings, C.V., The Hague (NL)

( * ) Notice: Subject to any disclaimer, the term of this patent is extended or adjusted under 35 U.S.C. 154(b) by 0 days.

(21) Appl. No.: 10/925,596

(22) Filed: Aug. 25, 2004

(65) Prior Publication Data

US 2006/0046927 A1    Mar. 2, 2006

(51) Int. Cl.
*B01J 37/00* (2006.01)

(52) U.S. Cl. ............... 502/103; 502/115; 502/116; 502/118; 526/124.3; 526/129; 526/348.5; 526/348.6; 526/348.2

(58) Field of Classification Search ............ 502/103, 502/115, 116, 118; 526/124.3, 129, 348.5, 526/348.6, 348.2
See application file for complete search history.

(56) References Cited

U.S. PATENT DOCUMENTS

| | | | | |
|---|---|---|---|---|
| 4,087,380 A | * | 5/1978 | Hyde et al. | 502/111 |
| 4,481,301 A | * | 11/1984 | Nowlin et al. | 502/104 |
| 4,521,573 A | * | 6/1985 | Lee et al. | 526/124.6 |
| 4,861,739 A | * | 8/1989 | Pellet et al. | 502/64 |
| 5,006,620 A | * | 4/1991 | Zolk et al. | 526/128 |
| 5,079,287 A | * | 1/1992 | Takeshi et al. | 524/528 |
| 5,895,770 A | * | 4/1999 | Pullukat et al. | 502/103 |
| 6,180,555 B1 | * | 1/2001 | Szabo et al. | 502/217 |
| 6,180,559 B1 | * | 1/2001 | Roberts et al. | 502/326 |
| 6,652,735 B1 | * | 11/2003 | Degnan et al. | 208/27 |
| 6,657,034 B1 | * | 12/2003 | Martin et al. | 526/352 |
| 2003/0173254 A1 | * | 9/2003 | Chen et al. | 208/120.01 |
| 2004/0229748 A1 | * | 11/2004 | Chen et al. | 502/118 |
| 2004/0248729 A1 | * | 12/2004 | Xiao et al. | 502/104 |

FOREIGN PATENT DOCUMENTS

| | | |
|---|---|---|
| EP | 0494084 A1 | 7/1993 |
| EP | 0776912 A1 | 6/1997 |
| EP | 001229054 A1 * | 8/2002 |

* cited by examiner

*Primary Examiner*—Elizabeth D. Wood
*Assistant Examiner*—Jennine Brown
(74) *Attorney, Agent, or Firm*—Dilworth & Barrese, LLP

(57) ABSTRACT

A method for making a Ziegler-Natta catalyst support includes the steps of contacting a fumed silica with a surface modifying agent such as a compound having the formula RMgX MgR'R'' wherein R, R' and R'' are each individually a moiety selected from an alkyl group, cycloalkyl, aryl or alkaryl group, and X is a halogen selected from the group consisting of chlorine, bromine and iodine, to provide a pretreated silica seeding agent. The pretreated silica seeding agent is then dispersed in a non-aqueous liquid magnesium halide/alkanol complex, and the magnesium halide is crystallized onto the silica particles to form catalyst support particles especially suitable for Ziegler-Natta catalysts.

37 Claims, 3 Drawing Sheets

Particle Size Distribution for resins produced at 50 delta psig of hydrogen.

METHOD OF MAKING A ZIEGLER-NATTA CATALYST

BACKGROUND

1. Field of the Invention

The present application is related to Ziegler-Natta catalysts, and particularly to a method for making a Ziegler-Natta catalyst.

2. Background of the Art

Ziegler-Natta catalysts are advantageously used in olefin polymerization reactions to produce stereoregulated linear polymers. It is known that Ziegler-Natta catalysts may be formed from a silica support material, a magnesium-halide compound, a transition metal compound, electron donor compound(s) and an organo-aluminum cocatalyst. The transition metal is an active catalytic ingredient and the magnesium-halide compound may also be thought of as being active to the extent that it acts as a synergist to increase the overall catalytic productivity of the transition metal. The electron donor compounds and organo-aluminum cocatalyst are important because they enable the Ziegler-Natta catalyst to catalyze the polymerization of isotactic polymers. The silica material is inactive and does not increase polymerization reaction rates.

It is known that silica-based Ziegler-Natta catalysts may be produced from high-porosity silica particles in the diameter range of about 10–100 microns, which may be coated with 1 or more relatively thin layers of a magnesium-halide compound (e.g., $MgCl_2$) to form a catalyst support, which may be treated with a transition metal to form a catalyst. However, this type of catalyst generally comprises a high ratio of inactive silica relative to the active ingredients. Further, the catalyst supports may need to be mechanically treated to produce generally spherical, or spheroidal, catalyst supports of the appropriate diameter and particle diameter distribution, which will form catalyst particles of the appropriate diameter and particle diameter distribution and, thus, will facilitate efficient polymerization reactions.

U.S. Pat. Nos. 4,293,673 and 4,376,062, both to Hamer et al., disclose methods for forming silica based catalysts with very small silica particles, no larger than about 0.05 micron, which are mixed in a slurry to form solid agglomerations comprising a number of silica particles mixed with active ingredients. While Hamer utilizes silica particles which are very small, the resulting catalysts still comprise at least 10 wt % inert silica material. This is undesirable because the higher the relative amount of inert silica material the lower the overall activity of the catalyst, and the higher the amount of catalyst residues in a polymer formed therewith. Thus, the production costs of the polymer, per weight unit of catalyst, is higher for catalysts containing relatively large amounts of inert material. Further, higher amounts of catalyst residues may detrimentally affect polymer processing and/or the physical properties of products made with the polymer.

Significant factors for controlling the polymerization reaction include the physical features of the catalyst particles, i.e., particle shape, size, and particle size distribution. The magnesium halide (e.g., magnesium chloride, $MgCl_2$) serves as a support for the transition metal catalyst. The particles of magnesium halide are formed into particles preferably by using a porous inorganic oxide (e.g. silica, alumina, etc.) as a nucleation aid. The magnesium halide can be deposited on a supporting core provided by the porous inorganic oxide particle. It is desirable to control the nucleation of the magnesium halide to provide consistent results.

A variety of technique exist for forming magnesium halide into a particular shape and size for use as a polymerization catalyst support. However, many of these methods are either elaborate, expensive, or have limited success in terms of optimizing both the shape and particle size distribution of $MgCl_2$. It would be advantageous to have a simple and relatively inexpensive method for producing $MgCl_2$ with a specified particle shape, size, and particle size distribution.

SUMMARY

A method is provided herein for making a catalyst support comprising the steps of (a) providing a silica seeding agent including silica particles having an average particle diameter of from about 0.001 microns to about 10 microns; (b) contacting the silica seeding agent with a surface modifying agent having the formula RMgX wherein R is an alkyl group, cycloalkyl, aryl or alkaryl group, and X is a halogen selected from the group consisting of chlorine, bromine and iodine, to provide a pretreated silica seeding agent; (c) providing a non-aqueous liquid magnesium halide/alkanol complex; (d) combining the non-aqueous liquid magnesium halide/alkanol complex with the pretreated silica; and (e) crystallizing the magnesium halide onto the silica particles to form catalyst support particles.

The method advantageously provides Ziegler-Natta catalyst support particles having a controlled and consistent particle size, shape and size distribution.

BRIEF DESCRIPTION OF THE DRAWINGS

Various embodiments are described below with reference to the drawings wherein.

DETAILED DESCRIPTION OF PREFERRED EMBODIMENT(S)

Figure 1:
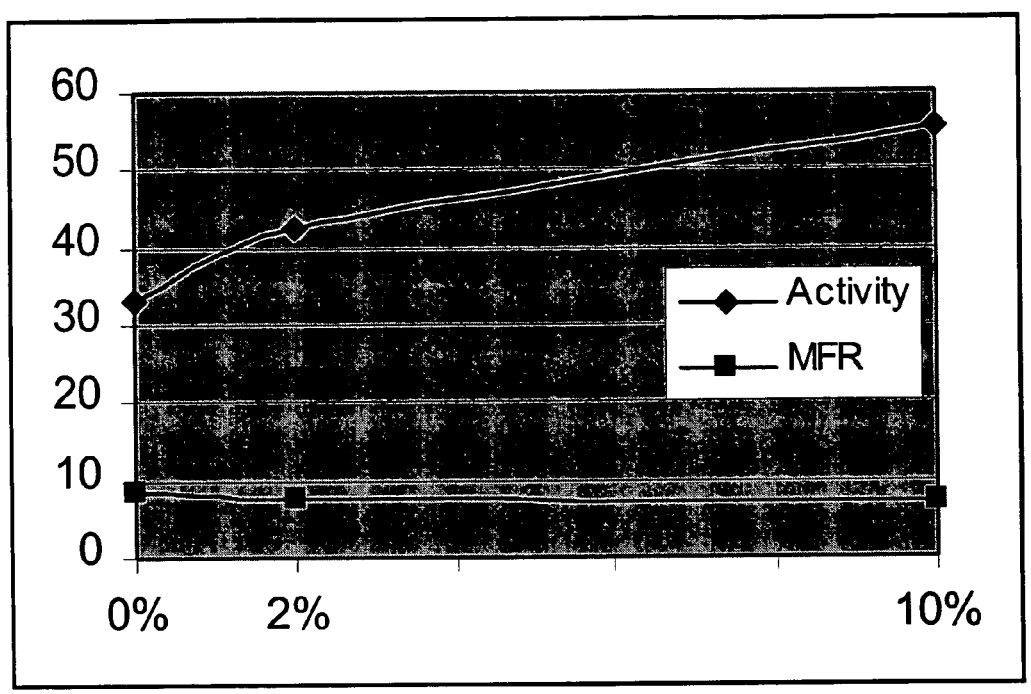
FIGS. 1, 2 and 3 are graphs illustrating the polymerization test results for catalysts produced in accordance with the method of this invention in comparison with a conventional magnesium chloride catalyst.

The Ziegler-Natta catalyst provided herein includes an aluminum compound, a solid catalytic component used in combination with the aluminum compound as a co-catalyst, and, optionally, an external electron donor. The solid catalytic component includes a transition metal compound such as titanium or vanadium, a magnesium halide compound which serves as a support for the transition metal compound, a porous particulate support which serves as a seeding agent for the magnesium halide, and, optionally, an internal electron donor.

In accordance with the method of the present invention the solid catalytic component is made by complexing magnesium halide in an alcohol at an elevated temperature to form a liquified solution, dispersing pre-treated fumed silica in the magnesium halide-alcohol solution, then crystallizing the magnesium halide onto the silica particles by controlled evaporation of the alcohol and/or reduction of solution temperature to provide magnesium halide support particles of a predetermined shape, size and particle size distribution. The magnesium halide support particles are treated with the transition metal compound to provide the solid catalytic component of the Ziegler-Natta catalyst.

The magnesium halide is a magnesium compound which includes at least one halogen (Cl, Br, I) and can correspond to the formula $MgX_2$, $Mg(XO_m)_2$, or $MgXOH$ wherein X is one of the aforementioned halogens and "m" is an integer from 1 to 4. Examples of suitable magnesium halides having the formula $MgX_2$ include magnesium chloride, magnesium bromide, and magnesium iodide. Examples of suitable magnesium halides having the formula $Mg(XO_m)_2$ include magnesium hypochlorite, magnesium chlorite, magnesium chlorate, magnesium perchlorate, magnesium bromate, magnesium perbromate, magnesium iodate and magnesium periodate. Examples of suitable magnesium halides having the formula MgXOH include chloromagnesium hydroxide, bromomagnesium hydroxide, iodomagnesium hydroxide. Especially preferred is magnesium chloride $MgCl_2$. While the invention is described below with particular reference to magnesium chloride, it should be recognized that other magnesium-halogen compounds may alternatively be used.

More particularly, in a preferred embodiment of the invention anhydrous (i.e., less than 0.5 wt % $H_2O$) magnesium chloride is combined with an anhydrous alcohol solvent such as anhydrous ethanol, methanol, or 2-ethyl-1-hexanol to form a soluble magnesium halide/alkanol complex.

The molar ratio of added alcohol to magnesium halide preferably ranges from about 2 to about 20, more preferably from about 5 to about 8 to facilitate the liquefying of the magnesium halide at a lower temperature. U.S. Pat. No. 4,421,674 to Invernizzi et al. teaches, for example, that when the mole ratio of ethanol ("EtOH") to $MgCl_2$ is 10.2, the complex liquefies at 60° C.; at a mole ratio of EtOH to $MgCl_2$ of 7.75 the complex liquefies at 80° C.; at a mole ratio of EtOH to $MgCl_2$ of 6.51 the complex liquefies at 90° C.; and at a mole ratio of EtOH to $MgCl_2$ of 5.43 the complex liquefies at 100° C. The mixture is heated to a temperature ranging from about 60° C. to about 140° C., preferably about 80° C. to about 120° C., until the solvent begins to reflux and the magnesium-halide compound goes into a solution, whereupon the mixture becomes transparent, and the temperature is maintained at the reflux temperature for about 0.25 hours to about 3.0 hours, preferably about 1.0 hour to about 2.0 hours, preferably with continuous stirring.

The silica seeding agent is a microspheroidal silica ($SiO_2$), for example, fumed silica such as CAB-O-SIL® silica available from Cabot Corporation of Midland, Mich., or Aerosil® brand fumed silica available from USA Midwest Degussa Corporation, Akron, Ohio.

The fumed silica particles are characterized by a relatively small average particle diameter, i.e., about 0.001–10 microns, preferably from about 0.005 to about 5.0 microns, more preferably from about 0.01 microns to about 1.0 micron. The silica has a relatively low porosity of less than about 0.5 cc/gram as measured by nitrogen absorption, which indicates that the silica particles have relatively smooth surfaces.

The silica seeding agent particles have relatively uniform spherical or spheroidal shape, i.e., approximately spherical shape, and preferably having a radius which does not vary by more than about 20% from the center to any point on the surface of the particle. The particles of the silica seeding agent have a relatively small particle diameter distribution, such that 50% of the silica particles have particle diameters ranging from about 0.05 microns to about 0.5 microns.

The small particle diameter of the silica seeding agent is significant because the resulting catalyst will ultimately comprise a relatively small percentage, i.e., less than 10 wt %, of inert silica material as compared to the total weight of the catalyst support. Thus, the catalyst will operate more efficiently because a relatively larger portion of the solid catalyst will comprise active catalytic material, i.e, the transition metal and the magnesium-halide synergist. In preferred catalyst supports the silica component will be less than 10 wt % of the total catalyst support weight, more preferably about 0.1 wt % to about 5 wt %, and yet more preferably about 0.5 wt % to about 3.0 wt % of the catalyst support formed by the above-described processes. Since the silica seeding agent provides a surface upon which the magnesium-halide compound will crystallize, the smooth, approximately spherical shape and small particle diameter distribution of the silica seeding agent will result in catalyst support particles, and ultimately catalyst particles, with a relatively smooth, approximately spherical shape and small particle diameter distribution. These qualities will contribute to an efficient polymerization process with a relatively small amount of fines in polymers produced in reactions conducted with the catalysts of the invention. This is an advantage over other catalysts which, for example, may need to undergo various complex and expensive processes in order to acquire an approximately spherical shape and/or acceptable particle diameter and particle diameter distribution.

In accordance with the invention the silica is pretreated with a surface modifying agent to facilitate the controlled deposition of magnesium chloride on the silica seeding particles. The silica particles have hydroxyl groups on their surface. A preferred surface modifying agent reacts with the hydroxyl groups to form linkages which attach the surface modifying agent. Preferred surface modifying agents include reactive Mg—C bonds such as Grignard compounds corresponding to the formula RMgX, wherein R can be any straight chain or branched alkyl group —$C_nH_{2n+1}$ wherein "n" is any integer from 1 to about 20 such as methyl, ethyl, propyl, isopropyl etc., or R is cycloalkyl, aryl or alkaryl, and X is a halogen, preferably chlorine. Also useful as surface modifying agents are compounds having the formula MgR'R" or R'MgOR", wherein R' and R" can be the same or different and individually can be any straight chain or branched alkyl group —$C_nH_{2n+1}$ wherein "n" is any integer from 1 to about 20 such as methyl, ethyl, propyl, isopropyl etc., or cycloalkyl, aryl or alkaryl. Without wishing to be bound by any particular theory, it is believed that the Grignard compound reacts with surface hydroxyl group (e.g., Si—OH) to form an Si—O—MgX linkage. The replacement of the —OH surface groups with —O—MgX favors the more even and consistent subsequent deposition of $MgX_2$ onto the surface of the silica. The non-Grignard compounds MgR'R" and R'MgOR" are similarly believed to replace the —OH groups to form Si—O—MgR" or Si—O—MgOR" linkages.

Examples of suitable organomagnesium Grignard compounds include n-butylmagnesium chloride, n-butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, octylmagnesium chloride, phenylmagnesium chloride, and phenylmagnesium bromide.

Examples of suitable compounds having the formulas MgR'R" or R'MgOR" include alkylmagneium compounds such as diethyl magnesium, dibutyl magnesium, dihexyl magnesium, diphenyl magnesium, and alkylmagnesium alkoxides such as butylmagnesium ethoxide, methylmagnesium butoxide, hexylmagnesium propoxide, phenylmagnesium ethoxide, and the like.

Fumed silica, such as Cab-O-Sil® silica, typically contains about 2.5 to about 3.0 mmoles of surface hydroxyl groups per gram. The surface hydroxyl groups can be determined by titration with a methyl Grignard compound (e.g., methylmagnesium chloride). Pretreatment of the silica may be accomplished by treating the silica with a molar equivalent or less of a magnesium surface modifying agent such as described above, then subsequently filtering the pretreated silica, washing in hexane, and then dispersing in mineral oil for reaction with the magnesium halide/alkanol complex.

In a preferred process, the pretreated silica is dispersed in the liquefied magnesium halide/alkanol complex. The magnesium halide is then crystallized around and onto the silica particles by the gradual and controlled evaporation of the alkanol solvent and/or the gradual reduction in temperature of the dispersion. The size of the resulting catalyst support particles also can be regulated by selecting the appropriate ratio of magnesium halide to silica and by controlling the time allowed for crystallization.

As an alternative, the pretreated silica seeding agent can be dispersed in a non-polar, non-ionic oil, for example, mineral oil, paraffin oil or silicone oil, in a mixing apparatus such as a simple paddle stirrer operating at a few hundred rpms or a Ultra-Turrax® T 50 Homogenizer with stirring speeds up to 10,000 rpms. Preferably, the ratio of silica seeding agent to oil is in the range of about 0.25 grams per liter to about 25.0 grams per liter, more preferably about 1.0 gram per liter to about 10.0 grams per liter.

The silica, optionally in the silica-oil dipersion, is combined with, for example, the soluble $MgCl_2.EtOH$ complex. Alternatively, the $MgCl_2$ can be added to the silica dispersion in oil, followed by subsequent addition of the anhydrous alkanol (ethanol, methanol, 2-ethyl-1-hexanol). About 0.01 wt % to about 10.0 wt %, more preferably from about 0.1 wt % to about 5.0 wt %, and still more preferably from about 0.5 wt % to about 3.0 wt % of the silica seeding agent is used relative to the magnesium-halide compound. Generally, a higher ratio of magnesium-halide to silica seeding agent in the mixture results in a higher ratio of magnesium-halide to silica in the catalyst support formed and, consequently, a larger catalyst support is expected to form because more magnesium-halide crystalizes onto the silica seeding agent.

The clear mixture, which includes a $MgCl_2.xEtOH$ complex (where x is an integer from 1–20), is rapidly transferred to a second mixing apparatus containing a pre-chilled hydrocarbon solvent, such as heptane, hexane, cyclohexane, or other aliphatic or cycloaliphatic hydrocarbon which is miscible in the oil and which will not freeze at the temperatures necessary for the solidification of the $MgCl_2.EtOH$ complex. The hydrocarbon solvent is pre-chilled to a temperature ranging from about −90° C. to about 0° C. The rapid temperature decrease of the silica/halide mixture causes almost all of the magnesium-halide compound to precipitate out of solution and crystallize onto the silica seeding agent, thus coating the silica seeding agent to form a catalyst support. The catalyst support particles preferably include significantly less than 10 wt % silica, preferably no more than 5 wt % silica, and more preferably no more than 3 wt % silica.

After about 0.5 to 2 hours, preferably about 1 hour, the mixture is allowed to warm to room temperature and is filtered. Approximately spherical and/or spheroidal solid catalyst support particles, each comprising at least one silica seeding agent with crystalline magnesium-halide attached thereto, are collected and washed several times with more hydrocarbon solvent, until the hydrocarbon solvent appears to be colorless. The catalyst support particles are dried (e.g., vacuum dried) in a rotary evaporator at about 40° C. to 80° C., preferably at about 60° C., for 1 to 3 hours, preferably for about 2 hours. The term "approximately spherical" or "approximately spheroidal" means that all points on the surface of the particle are within the range of radius r to 2r wherein r is the minimum radial distance between the center of mass of the particle and the closest point thereto on the surface of the particle. The magnesium-halide compound may alternately be crystallized onto the silica seeding agent with known spray drying techniques or by gradually evaporating the solvent in which it was originally dissolved.

Next, the catalyst support is slowly added to about 10 to 50 moles of a transition metal compound for each mole of magnesium in the magnesium-halide compound at from about −30° C. to about 50° C., and the temperature of this mixture is raised to about 20° C. to 80° C., preferably about 30° C. to 60° C. The transition metal is described more fully below. An internal electron donor is added and the temperature is raised, generally with stirring, to about 80 to 130° C., preferably 100–110° C., and is kept at that level for about 1 to 3 hours, preferably about 2 hours.

The internal electron donor compound, discussed in more detail below, is used in an amount from about 0.05 to about 2.0 moles, preferably about 0.1 to about 0.5 mole, for each mole of magnesium in the magnesium-halide compound.

The result is a mixture comprising solid catalyst particles and unreacted transition metal compound and internal electron donor compound.

The solid catalyst particles are filtered out and, preferably, extracted for about 1 to 3 hours, preferably about 2 hours, at about 110° C. to 140° C., more preferably about 125° C., with a mixture of transition metal compound (about 5 wt % to 30 wt %, preferably about 10 wt %), and an inert solvent, such as a $C_1$–$C_{10}$ alkylbenzene, preferably ethylbenzene (about 70 to 85 wt %, preferably about 90 wt %) in a known "Soxhlet" extraction type arrangement. This extraction treatment enhances catalyst activity and stereospecificity. Alternatively, the solid catalyst may receive any number of other known extraction treatments, which may optionally include a transition metal treatment. Alternatively, the catalyst could simply be boiled in a solution comprising a transition metal compound with or without an inert solvent, i.e., a solvent which will not react with the transition metal compound. U.S. Pat. No. 4,745,164 to Schweier et al. and U.S. Pat. No. 6,034,023 to Kersting et al., which are incorporated by reference herein, teach examples of extraction methods which may be utilized in the present invention.

The solid catalyst may be recovered by filtration, washed with an inert solvent, such as heptane, hexane, cyclohexane or other aliphatic or cycloaliphatic hydrocarbon, dried by draining off transition metal compound and solvent, washed a second time with the inert solvent, and dried.

The solid catalyst support particles and/or catalyst particles preferably comprise about 0.01 wt % to about 10 wt % silica, more preferably about 0.1 wt % to about 5 wt % silica.

The solid catalyst support particles and/or catalyst particles preferably have a weight percent ratio of silica to magnesium-halide compound in the range of about 1:20 to 1:3, preferably from about 1:10 to 1:4.

The catalyst may preferably be treated with an organoaluminum co-catalyst and an external electron donor or other stereoregulating agent to form a Ziegler-Natta catalyst, which may be used, for example, in polymerization reactions. Examples of external electron donor compounds which may be used in the catalytic system of the invention include mono- and polyfunctional carboxylic acids, carboxylic anhydrides and carboxylic esters, and ketones, ethers, alcohols, lactones as well as organic phosphorus and silicon compounds. Also, a mixture of two or more external electron donor compounds can be used. The external electron donor compound and the internal electron donor compound used in the preparation of the solid catalyst component may be the same or different. Preferred external electron donor compounds are disclosed below.

In such cases the organo-aluminum co-catalyst and the external electron donor may be contacted with the solid catalyst separately, in any order, or together, preferably at a temperature from about 0° C. to 200° C., more preferably from about 20° C. to 90° C., and preferably at a pressure of about 1 to 100 bar, more preferably from about 1 to 40 bar.

Preferably, the organo-aluminum co-catalyst is added in such an amount that the molar ratio of the aluminum co-catalyst to the transition metal in the solid catalyst is from about 10:1 to about 800:1, more preferably from about 20:1 to about 200:1.

The external electron donor is used with the catalyst in amounts ranging from about 1 to 100 moles, preferably 10 to 30 moles, for each mole of transition metal in the catalyst. Generally, it is highly preferred that an external electron donor, with or without the organo-aluminum co-catalyst, be used in order to maintain a high level of stereospecificity in polymers produced with the catalysts of the invention.

The diameters of the catalyst support particles will range from about 5–150 microns, more preferably from about 20–60 microns, most preferably from about 20–40 microns. The particle size distribution of the catalyst support particles is such that 50% of the catalyst support particles have particle diameters ranging from about 20 microns to about 60 microns.

The catalyst particles will have diameters which are about 20%–50% smaller than the support particles.

For example, a support particle with a 70 micron diameter may result in a catalyst particle with a 50–60 micron diameter. The reason for this reduction in size is as follows. It is generally known that ethanol dissolves the MgCl$_2$ by first swelling the structure of the solid MgCl$_2$. (MgCl$_2$ has a layered structure. Ethanol occupies the interstitial spaces between the MgCl$_2$ layers.) As more alcohol is added and/or the material is heated, this structure continues to swell or expand until the MgCl$_2$ layers segregate and the MgCl$_2$.EtOH complex becomes a liquid. When this complex is reacted with TiCl$_4$, the removal of ethanol causes the structure and thus the particle to shrink or diminish in size. Thus, the catalyst supports and catalysts of the invention are notable for having relatively thick layers of active ingredients, referring to both the synergistic magnesium-halide layer and active transition metal layer, on relatively small silica particles. Again, this results in the overall percentage of inactive silica delivered to a polymerization reactor to be lower than in other known processes. Consequently, overall efficiency in the polymerization reactor will be higher.

Preferably, catalyst support particles and catalyst particles of the invention will each include one silica seed particle, or a small group of silica seed particles comprising less than 10% of the total catalyst support weight. In contrast to the present invention, other known catalysts typically comprise relatively large silica particles or agglomerations of a number of very small silica particles within each catalyst support particle such that there is a relatively larger amount (e.g., up to 50 wt %) of inert silica in the catalyst particle.

Referring now to the previously mentioned transition metal component of the catalyst, said component can be a compound of titanium or vanadium.

Titanium compounds useful in preparing the solid catalyst component include the halogenides of tri- or tetravalent titanium. Titanium alkoxy halogenide compounds and mixtures of two or more titanium compounds are also contemplated. Examples of suitable titanium compounds include TiBr$_3$, TiBr$_4$, TiCl$_3$, TiCl$_4$, Ti(OCH$_3$)Cl$_3$, Ti(OC$_2$H$_5$)Cl$_3$, Ti(O-iso-C$_3$H$_7$)Cl$_3$, Ti(O-n-C$_4$H$_9$)Cl$_3$, Ti(OC$_2$H$_5$)Br$_3$, Ti(O-n-C$_4$H$_9$)Br$_3$, Ti(OCH$_3$)$_2$Cl$_2$, Ti(OC$_2$H$_5$)$_2$Cl$_2$, Ti(O-n-C$_4$H$_9$)$_2$Cl$_2$, Ti(OC$_2$H$_5$)$_2$Br$_2$, Ti(OCH$_3$)$_3$Cl, Ti(OC$_2$H$_5$)$_3$Cl, Ti(O-n-C$_4$H$_9$)$_3$Cl, Ti(OC$_2$H$_5$)$_3$Br, Ti(OCH$_3$)$_4$, Ti(OC$_2$H$_5$)$_4$, or Ti(O-n-C$_4$H$_9$)$_4$. Preferred titanium compounds include those wherein the halogen is chlorine. Also preferred are those titanium halogenides that in addition to the titanium contain only halogen, and of these the titanium chlorides, and in particular titanium tetrachloride, are preferred.

Vanadium compounds useful in the preparation of the solid catalytic component of the catalytic system described herein include the vanadium halogenides, the vanadium oxyhalogenides, the vanadium alkoxides and vanadium acetylacetonate. Preferred vanadium compounds are those having oxidation stages 3 to 5.

As stated above, one or more so-called internal electron donor compounds may be used in the preparation of the solid catalytic component.

The function of the internal and external electron donors, e.g., Lewis bases, is two-fold. One function is to block "coordinately unsaturated" sites on the magnesium compound so that the active site, the transition metal compound, will not attach to those sites. The other function is to reduce the "coordinately unsaturated" environment around the bound active site in order to improve its stereospecificity. Both results are the same, i.e. the electron donors improve the isotacticity or stereoregularity of polymers produced with the catalyst. The reason for this is that a "coordinately unsaturated" site has a lower energy barrier for binding propylene in various configurations, i.e., it can bond to propylene in multiple ways, leading to a reduction in polymer isotacticity and subsequently lower polymer crystallinity. Lower polymer crystallinity results in lower polymer melting points and increased hydrocarbon (e.g., xylene, decalin, or heptane) solubles. A "coordinatively saturated" site produces uniform or isotactic polypropylene. Examples of suitable internal electron donor compounds include mono or polyfunctional carboxylic acids, carboxylic anhydrides, or carboxylic esters, and also ketones, ethers, alcohols, lactones or organophosphorus or organosilicon compounds.

Preferred internal donor compounds included carboxylic acid derivatives and, in particular, phthalic acid derivatives having the general formula (I):

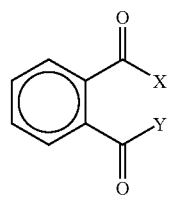

(I)

wherein X and Y each represent a chlorine or bromine atom or a $C_1$–$C_{10}$ alkoxy group, or X and Y taken together represent an oxygen atom forming an anhydride function. Particularly preferred internal electron donor compounds are phthalic esters of formula (I) wherein X and Y each are a $C_1$–$C_8$ alkoxy group, such as a methoxy, ethoxy, n-propyloxy, isopropyloxy, n-butyloxy, sec-butyloxy, or tert-butyloxy group. Examples of preferred phthalic esters include diethyl phthalate, di-n-butyl phthalate, di-isobutyl phthalate, di-n-pentyl phthalate, di-n-hexyl phthalate, di-n-heptyl phthalate, di-n-octyl phthalate or di-2-ethylhexyl phthalate.

Further examples of preferred internal electron donor compounds include diesters of 3- or 4-membered, optionally substituted, cycloalkane 1,2-dicarboxylic acids, as well as monoesters of substituted benzophenone 2-carboxylic acids or substituted benzophenone 3-carboxylic acids. As hydroxy compounds in the esterfication reaction for synthesis of these esters, alkanols such as $C_1$–$C_{15}$ or $C_5$–$C_7$ cycloalkanols (optionally substituted with one or more $C_1$–$C_8$ alkyl groups), as well as $C_1$–$C_{10}$ phenols, can be used. A particularly preferred internal electron donor is di-alkyl carboxylic acid ester.

A further group of suitable internal donor compounds are the non-substituted and substituted ($C_1$–$C_{10}$ alkyl)-1,3-propane diethers and derivatives of the group of succinates.

Also, mixtures of two or more internal electron donor compounds may be used in the preparation of the solid catalytic component of the invention.

When used in the preparation of the particulate solid component, the internal electron donor compound in general is used in an amount of from about 0.05 to about 2.0 moles, preferably about 0.2 to about 0.5 mole, for each mole of magnesium in the magnesium source, which includes the sum of the organomagnesium and magnesium halide compound.

In the preparation of the solid catalytic component, the following compounds can preferably be used as doping agents: $C_1$–$C_8$ alkanols, such as methanol, ethanol, n-propanol,-isopropyl alcohol, n-butanol, sec-butanol, tert-butanol, isobutyl alcohol, n-hexanol, n-heptanol, n-octanol or 2-ethylhexanol, or mixtures of two or more of these alkanols. A preferred alkanol is ethanol in amounts of about 1 to about 5 moles, preferably about 1.6 to about 4 moles, and more preferably about 1.5 to about 3.5 moles, for each mole of the sum of the organomagnesium and magnesium-halogen compound used.

With more specific reference to the aluminum catalyst, examples of suitable aluminum compounds include aluminum trialkyls and derivatives thereof wherein an alkyl group is substituted by an alkoxy group or a halogen atom, e.g., chlorine or bromine atom. The alkyl groups may be the same or different. The alkyl groups may be linear or branched chain alkyl groups. Preferred trialkylaluminum compounds are those wherein the alkyl groups each have 1 to 8 carbon atoms, such as trimethylaluminum, triethylaluminum, triisobutylaluminum, trioctylaluminum or methyldiethyl aluminum.

As mentioned above, in addition to the aluminum compound the catalytic system of the invention preferably includes as further co-catalyst an external electron donor compound, which serves as a stereoregulating agent. Examples of external electron donor compounds which may be used in the catalytic system of the invention include mono- and polyfunctional carboxylic acids, carboxylic anhydrides and carboxylic esters, and ketones, ethers, alcohols, lactones as well as organic phosphorus and silicon compounds. Also, a mixture of two or more external electron donor compounds can be used. The external electron donor compound and the internal electron donor compound used in the preparation of the solid catalyst component may be the same or different.

However, it is generally preferred that the internal and external electron donors be different because the desired internal electron donor is one which will block sites that lead to "coordinative unsaturation" or that transform "coordinatively unsaturated" sites into "coordinati\vely saturated" sites. And yet these internal electron donors do not react with $TiCl_4$. In the case of external electron donors, the desired molecule is one that will have the same affect on "coordinative saturation", but will not react with the aluminum alkyl cocatalyst. A molecule that yields "coordinative unsaturation" yet does not react with either $TiCl_4$ and $AlR_3$ would be ideal. However, due to the difficulty in finding such a single substance, most polypropylene catalysts employ tow separate substances for their internal and external electron donors. Preferred external electron donor compounds are the organosilicon compounds of general formula (II):

$$R^1{}_n Si(OR)_{4-n} \qquad (II)$$

wherein each $R^1$ may be the same or different and represents a $C_1$–$C_{20}$ alkyl group, a 5- to 7-membered cyclic alkyl group optionally substituted with $C_1$–$C_{10}$ alkyl, a $C_6$–$C_{18}$ aryl group or a $C_6$–$C_{18}$ aryl-$C_1$–$C_{10}$ alkyl group, and each $R^2$ may be the same or different and represents a $C_1$–$C_{20}$alkyl group, and n is an integer equal to 1, 2 or 3.

Preferred compounds of formula (II) are diisopropyldimethoxysilane, isobutylisopropyl-dimethoxysilane, diisobutyldimethoxysilane, dicyclopentyl-dimethoxysilane, cyclohexylmethyldimethoxysilane, dicyclohexyldimethoxysilane, isopropyl-tert-butyldimethoxysilane, isopropyl-sec-butyldimethoxysilane, and isobutyl-sec-butyldimethoxysilane.

Other stereoregulating agents which may be substituted for the external electron donor include alcohols, phenols, ketones, aldehydes, carboxylic acids, organic or inorganic acid esters, ethers, acid amides and acid anhydrides, and nitrogen-containing electron donors such as ammonia, amines, nitriles and isocyanates. Specific examples include alcohols having 1 to 18 carbon atoms which may have an alkyl group such as methanol, ethanol, propanol, pentanol, hexanol, octanol, 2-ethylhexanol, dodecanol, octadecyl alcohol, benzyl alcohol, phenylethyl alcohol, cumyl alcohol and isopropylbenzyl alcohol; phenols having 6 to 25 carbon atoms such as phenol, cresol, xylenol, ethylphenol, propylphenol, cumylphenol, nonylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexane-dicarboxylate, di-2-ethylhexyl 1,2-cyclohexane-dicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioctyl phthalate, gamma-butyrolactone, delta-valerolactone, coumarin, phthalide and ethylene carbonate; inorganic acid esters such as ethyl silicate, butyl silicate, vinyltriethoxysilane, phenyltriethoxysilane and diphenyldiethoxysilane; acid halides having 2 to 15 carbon atoms such as acetyl chloride, benzoyl chloride, tolyl chloride, anisoyl chloride and phthaloyl dichloride; ethers having 2 to 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

The catalysts of the invention may be advantageously used in the polymerization of alk-1-enes. Suitable alk-1-enes include linear or branches $C_2$–$C_{10}$ alkenes, in particular linear $C_2$–$C_{10}$ alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalysts of the invention are excellent catalytic systems for use in the production of propylene polymers, both homopolymers of propylene as well as copolymers of propylene and one or more further alk-1-enes having up to 10 carbon atoms.

The term copolymers as used herein also refers to copolymers wherein the further alk-1-ene having up to 10 carbon atoms is incorporated randomly. In these copolymers the comonomer content is generally less than about 15% by weight. The copolymers may also be in the form of so-called block or impact copolymers, which comprise at least a matrix of a propylene homopolymer or propylene random copolymer containing less than 15% by weight of a further alk-1-ene having up to 10 carbon atoms and a soft phase of a propylene copolymer containing about 15% to about 80% by weight of further alk-1-enes having up to 10 C-atoms. Also, mixtures of co-monomers are contemplated, resulting in, e.g., terpolymers of propylene.

The production of the propylene polymers may be carried out in any common reactor suitable for the polymerization of alk-1-enes, either batchwise or, preferably, continuously, i.e., in solution (bulk phase), as suspension polymerization or as gas phase polymerization. Examples of suitable reactors include continuously operated stirred reactors, loop reactors, fluid bed reactors, or horizontal or vertical stirred powder bed reactors. It will be understood that the polymerization may be carried out in a series of consecutively coupled reactors. The reaction time depends on the chosen reaction conditions. In general the reaction time is from about 0.2 hours to about 10 hours, usually from about 0.5 hours to 5.0 hours.

The molecular weight of the produced polymers may be controlled and adjusted over a wide range by adding polymer chain transfer or termination inducing agents as commonly used in the art of polymerization, such as hydrogen. In addition an inert solvent, such as toluene or hexane, or an inert gas, such as nitrogen or argon, and smaller amounts of a powdered polymer, e.g., polypropylene powder, may be added.

The weight, i.e., (average molecular weights) of the propylene polymers produced by using the catalytic system of the invention, in general, are in the range of from about 10,000 g/mole to 1,000,000 g/mole and the melt flow rates are in the range of from about 0.1 to about 100 g/10 min. The melt flow rate (MFR) corresponds to the amount which is pressed within 10 minutes from a test instrument in accordance with ISO 1133 at a temperature of 230° C. under a load of 2.06 kg. Certain applications might require different molecular weights than those mentioned above and are contemplated to be included among the polymers which are produced with the catalysts of the invention.

The catalytic systems of the invention enable the polymerization of the alk-1-enes to produce polymers having a good morphology and high bulk density when compared with the prior art catalytic systems. In addition, the catalytic systems of the invention have an increased productivity.

Various features of the invention are illustrated by the Examples set forth below:

EXAMPLE 1

This example illustrates treatment of silica with a Grinard compound of the formula RMgX.

5.0 Grams of Cab-o-Sil fumed silica were added to a 100 ml round bottom flask and then suspended in 45 ml of tetrahydrofuran (THF) under a nitrogen atmosphere. The Cab-o-Sil silica was reacted with 15 ml of 1.0M benzylmagnesiumchloride (15 mmol) in diethylether. The mixture was allowed to react at room temperature with occasional stirring for one hour. After an hour, 50 ml of heptane were added, mixed and the clear supernatant decanted. This was repeated two more times. The treated silica was then dried using a rotovap under full vacuum at 80° C. After 2 hours of drying, approximately 5.2 grams of dried material was collected.

EXAMPLE 2

This Example illustrates preparation of a catalyst.

The magnesium-treated silica (0.5 grams) was placed in a 500 ml round bottom flask along with 4.5 grams of anhydrous $MgCl_2$ and 2.0 ml of 200 proof ethanol. The mixture was then slurried in 250 ml of Durasyn 174 mineral oil. The flask was heated to 110° C. using a hot oil bath at which point the solution appeared almost clear. After refluxing for an hour, the contents were transferred via heat-traced Teflon tube to chilled heptane. After settling, the clear supernatant liquid was decanted and the solid collected on a glass frit. The solid was washed 3 times with heptane and then dried for 1 hour at 60° C. using the rotovap at full vacuum. The solids contained 10% silica in $MgCl_2$.

200 ml of $TiCl_4$ were charged to a glass-jacketed vessel and chilled to 0° C. The solid catalyst support prepared above was slowly added to the $TiCl_4$. After addition, the vessel temperature was maintained at 0° C. for 30 minutes and then warmed to room temperature. The slurry was then heated to 50 C and 1.5 ml of di-n-butylphthalate were added. The temperature was increased to 105 C and held there for 2 hours. The mixture was then transferred to a jacketed Soxhelt extractor. After filtering, the catalyst was extracted with a 9:1 mixture of ethylbenzene and titanium tetrachloride for 2 hours with the Soxhlet jacket set at 125 C. The extracted catalyst was finally washed with heptane and vacuum dried.

EXAMPLE 3

The catalyst of this Example was made in the same way as Example 2 except that 4.9 grams of anhydrous magnesium chloride (instead of 4.5 grams) were used along with 0.1 grams (instead of 0.5 grams) of magnesium-treated Cab-o-Sil silica to produce the catalyst. The resulting solid contained 2 wt % of silica in $MgCl_2$.

COMPARATIVE EXAMPLE

A magnesium chloride catalyst was prepared containing no silica in accordance with conventional catalyst preparation techniques.

EXAMPLE 4

The catalysts of Example 2 (containing 10 wt % silica), Example 3 (containing 2 wt % silica), and the Comparative Example (containing 0.0 wt % silica) were each treated in a polymerization reaction in according to the procedure set forth in this Example.

A quantity of 4 ml of 25 wt % triethylaluminum (TEAl) was added to a leg of a two-leg stainless steel injector, along with 2 ml of 0.1 molar solution of cyclohexylmethyl dimethoxysilane, as an external electron donor. The aluminum alkyl activates the catalyst by replacing one of the chlorides on the titanium with an alkyl group. Thereafter, alkylation can propagate continued insertion of propylene groups during a polymerization reaction. The external electron donor is important for controlling the nature of the propylene insertion, but it is not necessary for starting or maintaining propylene insertion.

20 Milligrams of a mixture containing 2 parts anhydrous $MgCl_2$ and 1 part of the catalyst prepared above was added to another leg of the injector. The catalyst was diluted in this manner to facilitate more accurate measurement of small quantities of catalyst tested in this example. The injector was then attached to the reactor so that the contents of the injector legs could be charged to the reactor under inert atmospheric conditions.

A polymerization reaction vessel comprising a 2-liter, stainless steel, jacketed pressure vessel, was purged of moisture and oxygen by heating to at least 100° C. while a slow bleed of dry nitrogen was maintained through the vessel. The TEAl and external electron donor were added to the reactor by flushing the appropriate injector leg with 600–800 ml of propylene. 100 delta-psig (as measured across a 300 ml vessel) of hydrogen was added to the reactor. The vessel was sealed and heated to about 70° C. Once the temperature was at about 70° C., the polymerization reaction was allowed to continue for one hour. The polymerization reaction was then stopped by venting the residual propylene. The polymerization reaction vessel was opened and polymer was removed.

Figure 2:
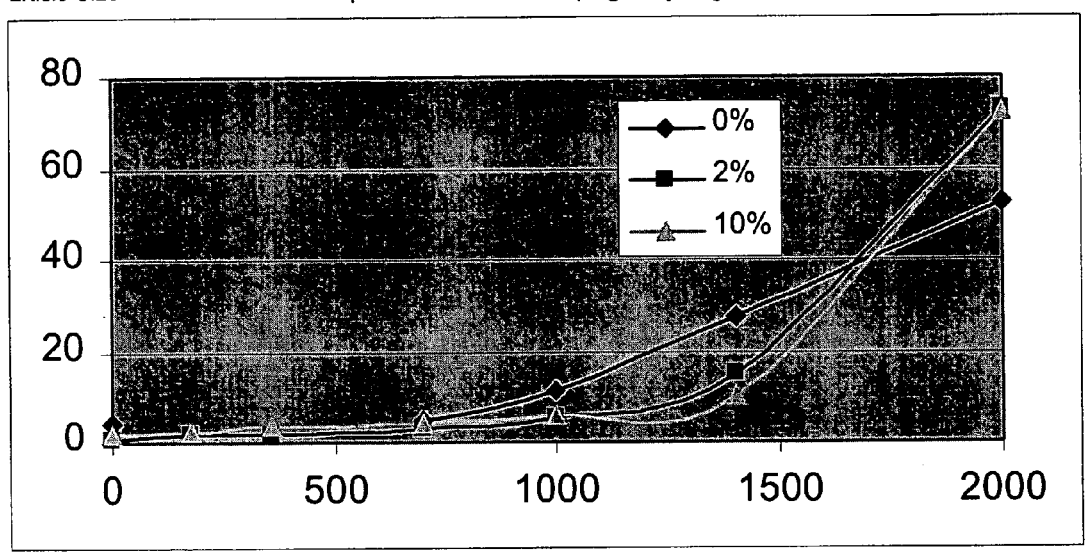
Figure 3:
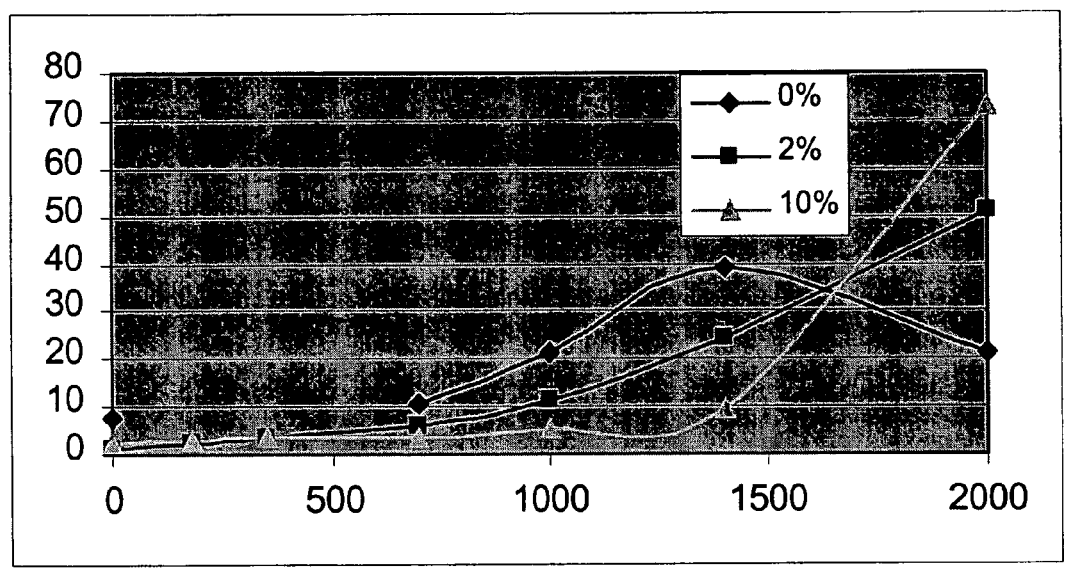

The results of the polymerization test are illustrated in FIGS. 1, 2 and 3.

FIG. 1 is a graph showing that all three catalyst exhibited a uniform hydrogen response as reflected by the flat MFR curve. However, the catalysts exhibited an increase in activity with increasing silica content.

FIG. 2 is a graph illustrating the particle size distribution of resins produced at 100 delta psig of hydrogen for the three catalysts. The catalysts containing fumed silica produced polymers with similar size distributions.

FIG. 3 shows the particle size distributions of resins produced at 50 delta psig of hydrogen for the three catalysts. As the silica content of the catalysts increased so did the average particle size.

The invention claimed is:

1. A method for making a catalyst support comprising the steps of:
   a) providing a silica seeding agent including silica particles having an average particle diameter of 0.001 up to less than 1.0 micron;
   b) contacting the silica seeding agent with a surface modifying agent having a formula selected from the group consisting of RMgX, MgR'R" and R'MgOR", wherein R, R' and R" are each individually a moiety selected from an alkyl, cycloalkyl, aryl or alkaryl group, and X is a halogen selected from the group consisting of chlorine, bromine and iodine, to provide a pretreated silica seeding agent;
   c) providing a non-aqueous liquid magnesium halide/alkanol complex;
   d) combining the non-aqueous liquid magnesium halide/alkanol complex with the pretreated silica; and
   e) crystallizing the magnesium halide onto the silica particles to form catalyst support particles.

2. The method of claim 1 wherein the silica particles have a radius which does not vary by more than about 20% from the center of the particles to any point on the particle surface.

3. The method of claim 1 wherein 50% of the silica particles have particle diameter diameters ranging from about 0.05 microns to about 0.5 microns.

4. The method of claim 1 wherein R is an alkyl group having the formula $—C_nH_{2n+1}$ wherein n is any integer from 1 to about 20, and X is chlorine.

5. The method of claim 1 wherein the surface modifying agent has the formula RMgX and is a compound selected from the groups consisting of n-butylmagnesium chloride, n-butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, octylmagnesium chloride, phenylmagnesium chloride and phenylmagnesium bromide.

6. The method of claim 1 wherein the surface modifying agent is a compound having the formula MgR'R".

7. The method of claim 1 wherein the surface modifying agent is a compound having the formula R'MgOR".

8. The method of claim 1 wherein the step (c) of providing a non-aqueous liquid magnesium halide/alkanol complex comprises combining an anhydrous magnesium halide with an anhydrous alcohol at a mole ratio of alcohol to magnesium halide of from about 2 to about 20 to form a mixture, and heating the mixture to a liquefaction temperature.

9. The method of claim 8 wherein the magnesium halide is a compound having a formula $MgX_2$ wherein X is a halogen.

10. The method of claim 9 wherein the magnesium halide is a compound selected from the groups consisting of magnesium bromide, and magnesium iodide.

11. The method of claim 10 wherein the magnesium halide is magnesium chloride.

12. The method of claim 8 wherein the magnesium halide is a compound having the formula $Mg(XO_m)_2$ wherein X is a halogen and m is an integer of from 1 to 4.

13. The method of claim 12 is wherein the magnesium halide is a compound selected from the group consisting of magnesium hypochlorite, magnesium chlorite, magnesium chlorate, magnesium perchlorate, magnesium bromate, magnesium perbromate, magnesium iodate and magnesium periodate.

14. The method of claim 8 wherein the magnesium halide is a compound having the formula MgXOH wherein X is a halogen.

15. The method of claim 14 wherein the magnesium halide is a compound selected from the group consisting of chloromagnesium hydroxide, bromomagnesium hydroxide and iodomagnesium hydroxide.

16. The method of claim 8 wherein the alkanol is selected from the group consisting of ethanol, methanol and 2-ethyl-1-hexanol.

17. The method of claim 1 wherein the step (d) of combining the non-aqueous liquid magnesium halide/alkanol complex with the pretreated silica comprises dispersing the pretreated silica in the liquefied magnesium halide/alkanol complex.

18. The method of claim 1 wherein the step (d) of combining the nonaqueous liquid magnesium halide/alkanol complex with the pretreated silica comprises dispersing the pretreated silica in a non-polar, non-ionic oil and combining the nonaqueous liquid magnesium halide/alkanol complex with the pretreated silica in the non-polar, non-ionic oil, wherein the non-polar non-ionic oil is at a temperature above the melting point of the non-aqueous liquid magnesium halide/alkanol complex, and step (e) comprises chilling the non-polar non-ionic oil to a temperature below the melting point of the magnesium halide/alkanol complex to crystallize the magnesium halide onto the silica particles.

19. The method of claim 16 wherein the non-polar, non-ionic, oil is selected from the group consisting of mineral oil, paraffin oil and silicone oil.

20. The method of claim 16 wherein the step (e) of crystallizing the magnesium halide onto the silica particles comprises evaporating the alkanol from the magnesium halide/alkanol complex and/or reducing the temperature of the magnesium halide/alkanol complex.

21. The method of claim 1 wherein the step (e) of crystallizing the magnesium halide onto the silica particles comprises chilling a hydrocarbon solvent to a temperature of from about −90° C. to about 0° C., then adding the combined magnesium halide/alkanol complex and pretreated silica to the chilled hydrocarbon solvent.

22. The method of claim 19 wherein the hydrocarbon solvent is a compound selected from the group consisting of heptane, hexane, and cyclohexane.

23. A method of making a Ziegler-Natta catalyst comprising the steps of
   a) providing a silica seeding agent including silica particles having an average particle diameter of 0.001 up to less than 1.0 micron, a porosity of less than about 0.5 cc/g as measured by nitrogen absorption and a radius which does not vary by more than about 20% from the center of the particles to any point on the particle surface;
   b) contacting the silica seeding agent with a surface modifying agent having a formula selected from the group consisting of RMgX, MgR'R" and R'MgOR", wherein R, R' and R" are each individually a moiety selected from an alkyl, cycloalkyl, aryl or alkaryl group, and X is a halogen selected from the group consisting of chlorine, bromine and iodine, to provide a pretreated silica seeding agent;
   c) providing a non-aqueous liquid magnesium halide/alkanol complex;
   d) combining the non-aqueous liquid magnesium halide/alkanol complex with the pretreated silica;
   e) crystallizing the magnesium halide onto the silica particles to form approximately spherical catalyst support particles;
   f) recovering the catalyst support particles;
   g) treating the catalyst support particles with a transition metal compound to form a solid catalyst component;
   h) recovering the solid catalyst component; and
   i) combining the solid catalyst component with an organo-aluminum cocatalyst.

24. The method of claim 23 wherein the surface modifying agent has the formula RMgX and is a compound selected from the group consisting of n-butylmagnesium chloride, n-butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, octylmagnesium chloride, phenylmagnesium chloride and phenylmagnesium bromide.

25. The method of claim 23 wherein the surface wherein the surface modifying agent is a compound having the formula MgR'R".

26. The method of claim 23 wherein the surface modifying agent is a compound having the formula R'MgOR".

27. The method of claim 23 wherein the step (c) of providing a non-aqueous liquid magnesium halide/alkanol complex comprises combining an anhydrous magnesium halide with an anhydrous alcohol at a mole ratio of alcohol to magnesium halide of from about 2 to about 20 to form a mixture, and heating the mixture to a liquefaction temperature.

28. The method of claim 27 wherein the magnesium halide is magnesium chloride and the alkanol is ethanol.

29. The method of claim 23 wherein the step (e) of crystallizing the magnesium halide onto the silica particles comprises chilling a hydrocarbon solvent to a temperature of from about −90° C. to about 0° C., then adding the combined magnesium halide/alkanol complex and pretreated silica to the chilled hydrocarbon solvent.

30. The method of claim 23 wherein the transition metal compound is selected from the group consisting of titanium compounds and vanadium compounds.

31. The method of claim 23 further including the step of treating the catalyst support particles with an internal electron donor.

32. The method of claim 31 wherein the internal electron door is a compound selected from the group consisting of diethyl phthalate, di-n-pentyl phthalate, di-n-hexyl phthalate, di-n-heptyl phthalate, di-n-octyl phthalate and di-2-ethylhexyl phthalate.

33. The method of claim 23 wherein the organo-aluminum cocatalyst is selected from the group consisting of trimethyl aluminum, triethyl aluminum, tri-isobutyl aluminum, trioctyl aluminum and methyldiethyl aluminum.

34. The method of claim 23 further comprising the step of combining an external electron donor with the solid catalyst component and the organo-aluminum cocatalyst.

35. The method of claim 34 wherein the external electron donor is an organosilicon compound having the formula

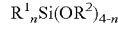

wherein each $R^1$ can be the same or different and is a $C_1$–$C_{20}$ alkyl group, a 5- to 7-membered cyclic alkyl group optionally substituted with $C_1$–$C_{10}$ alkyl, a $C_6$–$C_{18}$ aryl-$C_1$–$C_{10}$ alkyl group, $R^2$ is a $C_1$–$C_{20}$ alkyl group, and n is an integer equal to 1, 2 or 3.

36. A method for the polymerization of an olefin comprising:
   a) providing a Ziegler-Natta catalyst in accordance with a method including the steps of
      i. providing a silica seeding agent including silica particles having an average particle diameter of 0.001 up to less than 1.0 micron, a porosity of less than about 0.5 cc/g as measured by nitrogen absorption, and a radius which does not vary by more than about 20% from the center of the particles to any point on the particle surface,
      ii. contacting the silica seeding agent with a surface modifying agent having a formula selected from the group consisting of RMgX, MgR'R" and R'MgOR", wherein R, R' and R" are each individually a moiety selected from an alkyl, cycloalkyl, aryl or alkaryl group, and X is a halogen selected from the group consisting of chlorine, bromine and iodine, to provide a pretreated silica seeding agent,
iii. providing a non-aqueous liquid magnesium halide/alkanol complex,
iv. combining the non-aqueous liquid magnesium halide/alkanol complex with the pretreated silica,
v. crystallizing the magnesium halide onto the silica particles to form approximately spherical catalyst support particles,
vi. recovering the catalyst support particles,
vii. treating the catalyst support particles with a transition metal compound to form a solid catalyst component,
viii. recovering the solid catalyst component, and
ix. combining the solid catalyst component with an organo-aluminum cocatalyst to provide the Ziegler-Natta catalyst; and,
b) contacting the olefin with the Ziegler-Natta catalyst under olefin polymerization reaction conditions.

37. The method of claim 36 wherein the olefin is selected from the group consisting of ethylene, propylene, but-1-ene, pent-1-ene, hex-1-ene, hept-1-ene, oct-1-ene, non-1-ene, dec-1-ene, 4-methylpent-1-ene and mixtures thereof.

* * * * *